M. R. Marcell.
Harrow.

N° 92,071.   Patented Jun. 29, 1869.

Witnesses:
R. F. Osgood.
Geo. W. Miatt.

Inventor:
M. R. Marcell
By J. Fraser & Co
Att'y

United States Patent Office.

M. R. MARCELL, OF DANSVILLE, NEW YORK, ASSIGNOR TO HIMSELF, AND HIRAM CULVER, OF SAME PLACE.

Letters Patent No. 92,071, dated June 29, 1869.

IMPROVEMENT IN HARROW.

The Schedule referred to in these Letters Patent and making part of the same.

*To all whom it may concern:*

Be it known that I, M. R. MARCELL, assignor to myself and HIRAM CULVER, both of Dansville, in the county of Livingston, and State of New York, have invented a certain new and useful Improvement in Harrows; and I do hereby declare that the following is a full and exact description thereof, reference being had to the accompanying drawings, making part of this specification, in which—

Figure 1:
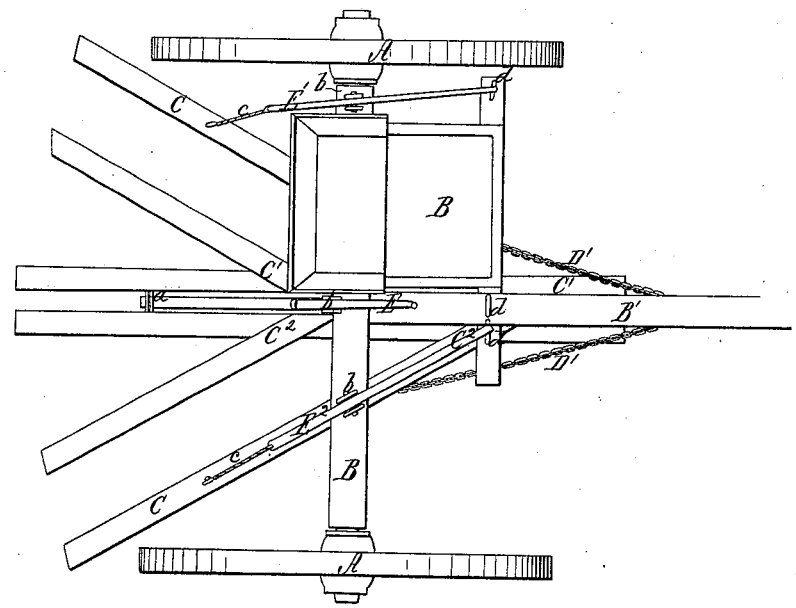

Figure 1 represents a plan of my improved harrow, and

Figure 2:
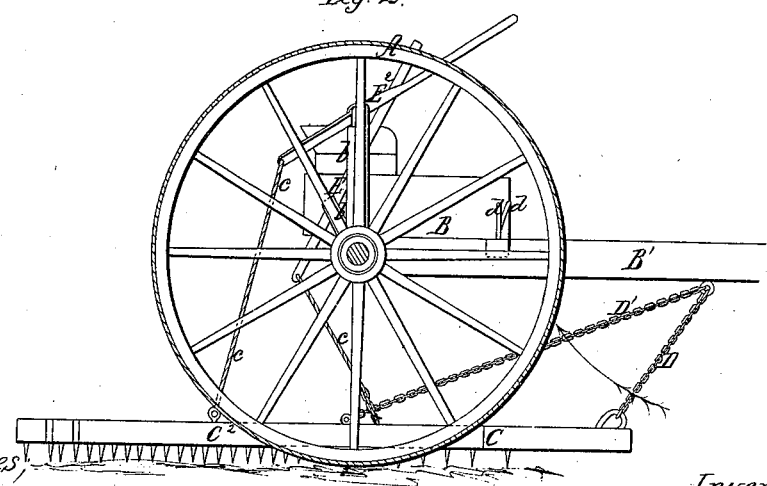

Figure 2, an elevation of the same.

Like letters of reference indicate corresponding parts in both figures.

My invention consists in the special manner of connecting the harrow with a frame mounted on wheels, whereby either side or the centre of the same may be independently elevated, by lever-work, to clear from sods, and whereby an improved draught is attained.

In the drawings—

A A represent the wheels;

B, the frame; and

C, the harrow.

The latter is made up of two parts, $C^1 C^2$, jointed together longitudinally in the centre, as shown at $a$.

The harrow is connected with the pole B' by two sets of draught-chains D D', the first being a single chain extending down and secured to the front end of the harrow, and the last being a double chain extending further back, and secured on opposite sides to the harrow, about midway of its length.

By this special arrangement of the draught-chains, I accomplish an important effect in dividing the draught, so that it is much easier, and, at the same time, more equal and uniform in its action on the soil, than it would be if simply connected with the front end alone, in which case, the harrow could, in no degree, be sustained by the wheel-frame, but would drag heavily back.

When the harrow is elevated by the lever-work, hereafter described, the slight backward action of said levers causes the harrow to bear upon chain D', while it is held in position by chain D, and in this manner the effect of said chains is special in assisting in the elevation of the harrow, and this feature I claim as one of the novelties in my case.

Three levers, $E\ E^1\ E^2$, are arranged in fulcra $b\ b\ b$ to turn vertically, and these levers are respectively connected with the sides and the centre of the harrow, by chains or connections $c\ c\ c$.

When these levers are turned down to elevate the harrow, they engage with the catches $d\ d\ d$ to retain them in place.

By this arrangement of the levers, not only may the whole harrow be elevated bodily, but either side or the centre may be elevated independently of the others.

I can thus discharge sods or other impediments from either side or the centre, without disturbing the other parts, which is of much importance, to avoid breaks in the action of the working-machine, which would occur were the whole harrow to be raised.

This arrangement of the levers working in conjunction with the draught-chains D D', as before described, insures a perfect working of the machine, with much less trouble and labor than in the old-fashioned drag, with the team connected directly thereto.

What I claim as my invention, and desire to secure by Letters Patent, is—

The combination, with the jointed harrow $C^1 C^2$, elevating-levers $E\ E^1\ E^2$, and wheel-frame B, of the double set of draught-chains D D', radiating from the pole B', whereby one chain, D, holds the harrow in place, as it straightens back, and the other, D', balances it when elevated, as herein set forth.

In witness whereof, I have hereunto signed my name, in the presence of two subscribing witnesses.

M. R. MARCELL.

Witnesses:
 D. W. NOYES,
 R. WHITEMAN.